United States Patent [19]
Putman

[11] 3,911,356
[45] Oct. 7, 1975

[54] ELECTRICAL MEASURING INSTRUMENT HAVING STATIONARY COIL-MOVING IRON MECHANISM WHICH OPERATES ON ATTRACTION PRINCIPLE

[75] Inventor: Thomas H. Putman, Pittsburgh, Pa.

[73] Assignee: Westinghouse Electric Corporation, Pittsburgh, Pa.

[22] Filed: May 20, 1974

[21] Appl. No.: 471,732

[52] U.S. Cl. .............................................. 324/147
[51] Int. Cl.² ......................................... G01R 5/18
[58] Field of Search ........... 324/146, 147, 154, 151

[56] References Cited
UNITED STATES PATENTS

| | | | |
|---|---|---|---|
| 2,610,989 | 9/1952 | Wiese et al. | 324/147 |
| 2,897,447 | 7/1959 | Clark | 324/147 |
| 3,585,501 | 6/1971 | Okada | 324/147 |

FOREIGN PATENTS OR APPLICATIONS

| | | | |
|---|---|---|---|
| 18,251 | 8/1892 | United Kingdom | 324/147 |
| 142,900 | 5/1920 | United Kingdom | 324/147 |
| 565,201 | 10/1944 | United Kingdom | 324/147 |

Primary Examiner—Gerard R. Strecker
Attorney, Agent, or Firm—D. R. Lackey

[57] ABSTRACT

An instrument for measuring the magnitude of an electrical current. A coil, through which the current to be measured flows, is positioned between two spaced plates constructed of a magnetic material, with each plate having a generally spirally-shaped opening therein. U-shaped magnetic members are positioned to complete a magnetic circuit through the plates. A movable magnetic member extends substantially vertically between the openings of the plates, providing a magnetic path between the plates for magnetic flux flowing through the center of the coil. The movable member is mounted for restrained rotation within the openings of the plates, with the angular movement being responsive to the magnitude of the current flowing in the coil. The rotation of the movable member with increasing current reduces the distance between the movable member and the adjacent surfaces of the plates which define their generally spirally-shaped openings.

28 Claims, 10 Drawing Figures

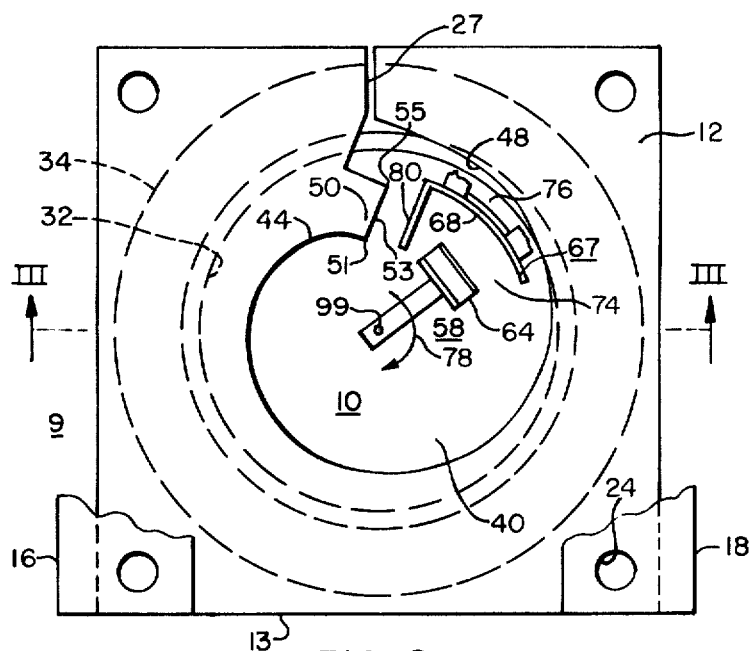
FIG. 2
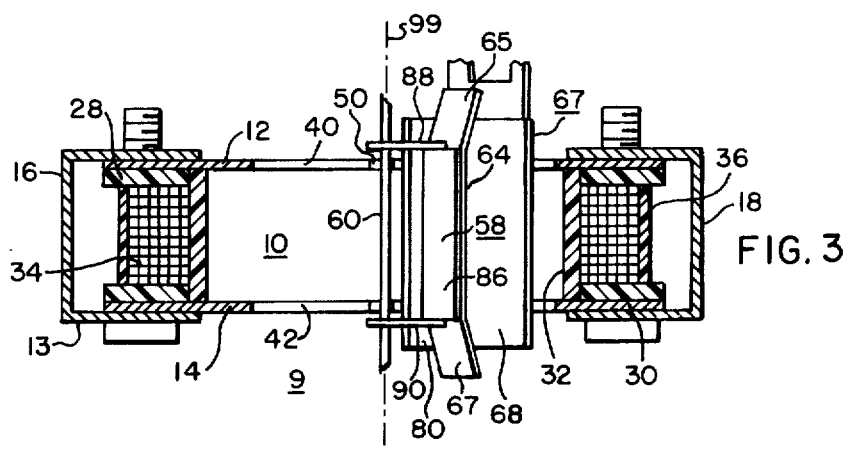
FIG. 3
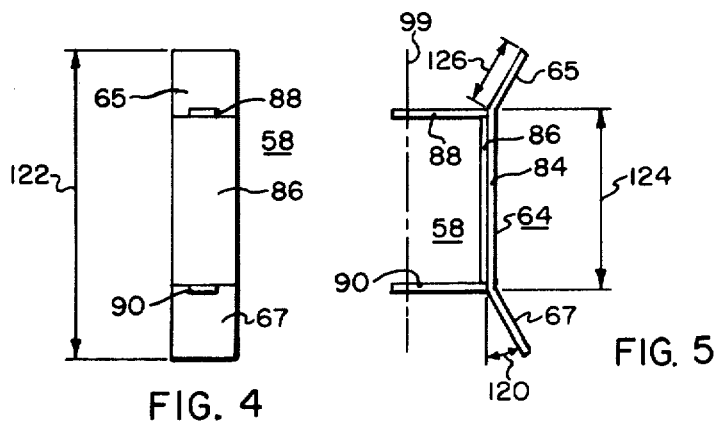
FIG. 4
FIG. 5

ELECTRICAL MEASURING INSTRUMENT HAVING STATIONARY COIL-MOVING IRON MECHANISM WHICH OPERATES ON ATTRACTION PRINCIPLE

BACKGROUND OF THE INVENTION

1. Field of the Invention

The invention relates in general to electrical measurement apparatus, and more specifically to electrical instruments which employ the stationary coil-moving iron mechanism.

2. Description of the Prior Art

The stationary coil-moving iron mechanism is generally used in electrical instruments for measuring alternating currents. Although this type of mechanism will measure direct current, the retentiveness of known magnetic materials provides a residual magnetism which results in up to a 1% residual magnetic effect error. With alternating currents this error is not present. The stationary coil-moving iron mechanism is additionally ideally suited to measuring alternating currents because the deflecting torque is proportional to the square or power value of the current measured. Thus, its accuracy is relatively unaffected by deviations from a sine wave. Other advantages of the stationary coil-moving iron instrument, such as high overload capacity, relatively small temperature error, and the fact that relatively large currents may be measured before auxiliary apparatus such as current and potential transformers are required, all combine to make it a highly useful and economical instrument for measuring alternating currents.

Conventional stationary coil-moving iron mechanisms include a movable member or moving iron vane, and stator members. In order to obtain a wide range of pointer movement, such as required by a 250° circular scale instrument, both the attraction and repulsion principles are used. Current flow through the coil of the mechanism, the magnitude of which is proportional to the quantity being measured, causes the initial deflection of the moving element and pointer due to instantaneously induced electromagnetic poles of similar polarity on the corresponding ends of a stationary repulsion vane and the moving vane. The movement of the moving element and pointer in the upper part of the scale is caused by instantaneously induced electromagnetic poles of opposite polarity on the corresponding ends of two attraction vanes and the moving vane.

The repulsion and attraction vanes are formed of thin strips of magnetic metallic material having predetermined configurations, which strips are formed such that major opposed surfaces are curved in arcuate shapes. These arcuate members are mounted with their longitudinal axes coincident with the rotational axis of the iron vane. The repulsion vane is centrally disposed about the moving iron vane, and the two attraction vanes are disposed in spaced relation adjacent opposite ends of the repulsion vane.

The repulsion and attraction vanes are shaped such that as the pointer attached to the moving vane moves up scale, the spacing between the ends of the moving vane and the polarized edges of the repulsion vane increases, and at the same time the spacing between the ends of the moving vane and the polarized edges of the attraction vanes decreases. The shape and relative locations of the edges of the various vanes are developed to blend repulsion and attraction forces against the opposing twist force of the restoring means to provide a substantially uniform scale distribution.

The variables of the moving iron vane and stator members of conventional moving iron mechanisms, such as their size, shape and relative positions, must be maintained to close tolerances to control the iron circuit for consistent calibration and to maintain instrument stability through temperature and humidity changes. The rather inconvenient locations of the iron vane and stator members in conventional instruments make their placement and adjustment an intricate procedure which appreciably increases the manufacturing cost of this otherwise simple mechanism. The arrangement of the movable and stationary members of the conventional moving iron mechanism does not provide a construction which is easily maintained to accurate standards with production machinery. Therefore, it would be desirable to provide a new and improved electrical measuring instrument having a stationary coil-moving iron mechanism which provides accurate and reliable measurements of electrical currents, and which may be manufactured from parts which permit economical construction and assembly.

SUMMARY OF THE INVENTION

Briefly, the present invention is a new and improved electrical instrument having a stationary coil-moving iron mechanism which is constructed of easily manufactured and assembled parts. The mechanism includes a coil having an opening, with the coil being positioned between two spaced magnetic plates. The plates may be punched from magnetic sheet material. Each of the plates defines a generally spirally-shaped opening, which openings are in communication with the opening in the coil. U-shaped magnetic yokes complete the magnetic circuit around the coil. A moving iron vane is mounted for restrained rotation within the coil opening, and is dimensioned to extend between the magnetic plates. The magnetic flux through the coil opening traverses first and second flux paths or magnetic circuits which influence the deflection of the moving iron vane. The first flux path extends from one of the magnetic plates, across an air gap to the moving iron vane, through the moving iron vane, and across another air gap to the other magnetic plate. The moving iron vane coacts with the magnetic flux provided by current flow through the coil to provide a rotational torque on the moving iron vane. When the magnitude of the current through the coil increases, it provides a torque on the moving iron vane which rotates the moving iron vane in a direction to reduce the length of the air gaps. The rotation of the moving iron vane moves a pointer attached thereto to provide a visual indication of the amount of rotation, and thus an indication of the magnitude of the current flowing through the coil. An adjustable shunt or magnetic shield is positioned within the coil and between the magnetic plates. This shield provides the second flux path. Projections on the magnetic plates extend into their associated openings. These projections are dimensioned and located such that they cooperate with the location and dimensions of the magnetic shield to increase the total change in permeance of the first flux path over and above that which would otherwise be possible using only the generally spirally-shaped openings in the magnetic plates. This increased change in permeance enables the mechanism to achieve a wider range of pointer movement, and thus the mechanism may be used with extra long scale instruments, such as 180° and 250° circular scale instruments.

BRIEF DESCRIPTION OF THE DRAWING

The invention may be better understood, and further advantages and uses thereof more readily apparent, when considered in view of the following detailed description of exemplary embodiments, taken with the accompanying drawings, in which:

FIG. 2 is a plan view illustrating the stator and moving iron vane of the mechanism shown in FIG. 1;

FIG. 3 is a sectional view of the mechanism shown in FIG. 2 taken in the direction of the arrows III—III;

FIG. 4 is a front elevational view of the moving iron vane shown in FIGS. 1, 2 and 3;

FIG. 5 is a side elevational view of the moving iron vane shown in FIG. 4;

DESCRIPTION OF THE PREFERRED EMBODIMENTS

Figure 1:
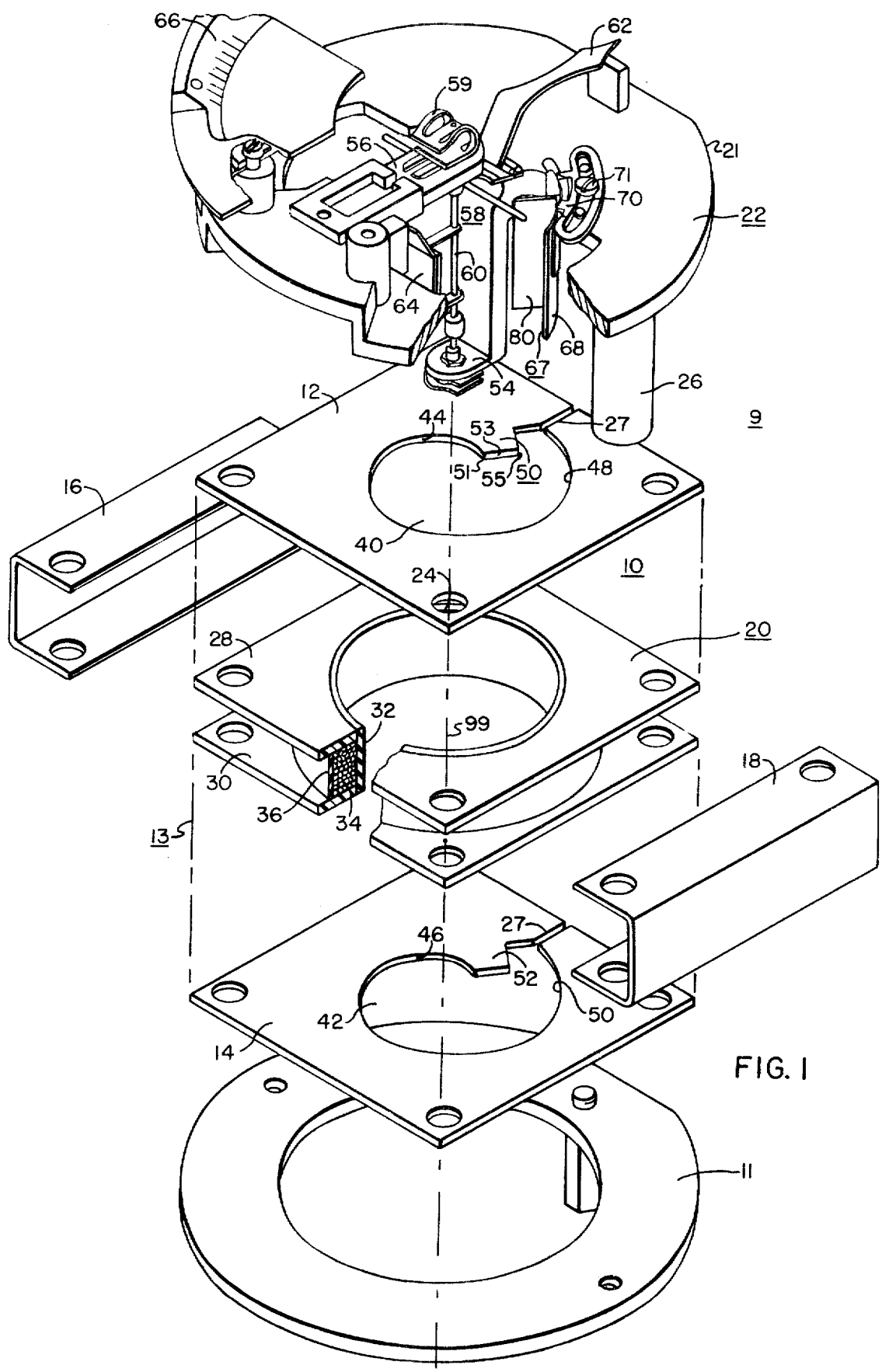
FIG. 1 is an exploded perspective view of an electrical measuring instrument having a stationary coil-moving iron mechanism constructed according to the teachings of the invention.

Referring now to the drawing, and to FIG. 1 in particular, there is shown an exploded perspective view of an electrical instrument 9 having a stationary coil-moving iron mechanism 10 constructed according to the teachings of the invention. In the specific embodiment illustrated, the instrument 9 includes a base or mounting ring 11 to which the other components of the instrument are attached. The mechanism 10 includes a magnetic circuit and coil assembly 13 having first and second spaced magnetic plate-like members 12 and 14, each having a central opening therein, substantially U-shaped channel members or yokes 16 and 18 which couple the magnetic plates 12 and 14 at opposite sides thereof, and a winding assembly 20. The magnetic circuit and coil assembly 13 is attached to one side of a mounting plate 21, which is part of a support assembly 22. For example, bolts (not shown) may extend through openings in the corners of the magnetic circuit and coil assembly 13, such as the opening 24, into tapped openings disposed in the mounting plate 21. The support assembly 22 is attached to the mounting ring 11 by screws (not shown) which extend into standoff members secured to the mounting plate 21 of the support assembly 22, such as the standoff member 26.

The winding assembly 20 includes first and second spaced insulating plate members 28 and 30, respectively, which have central openings disposed therein, and a tubular insulating cylinder 32 which extends snugly into the openings in the plates 28 and 30. The cylinder 32 may be secured to the inner surfaces of the insulating plate members 28 and 30 by a suitable adhesive. Alternatively, cylinder 32 and plate members 28 and 30 may be molded as a single item. Winding assembly 20 includes a coil or winding 34 having a plurality of turns of an insulated electrical conductor wound about the insulating cylinder 32. Electrical leads (not shown) from the coil 34 are provided for introducing the current to be measured into the coil 34. The winding or coil 34 is wrapped with a layer 36 of suitable insulation which secures the coil 34 on the insulating cylinder 32, between the spaced insulating plate members 28 and 30.

The magnetic plate members 12 and 14 are preferably formed of a magnetically soft metallic material, such as by stamping or punching the plate members from a sheet of such material, with a suitable die. The magnetic material should have a low hysteresis loss, low eddy current loss, high magnetic permeability, and a high saturation value. To provide consistent and optimum electrical characteristics, the plate members 12 and 14 are preferably oriented in a similar manner with respect to the rolling direction of the magnetic sheet material from which they are punched, and the plate members are then annealed. The iron-nickel alloys, such as the alloys available commercially under the trade names "Permalloy 49" and "Hipernik", are excellent. While the magnetic plate members 12 and 14 are illustrated in the preferred manner of having a single lamination, it is to be understood that the plate members 12 and 14 may each include a plurality of superposed magnetic laminations, if desired.

The magnetic circuit portion of the instrument also includes the substantially U-shaped channel members or yokes 16 and 18 which may be constructed of the same material used for the magnetic plate members 12 and 14. In the assembled instrument, the magnetic plate members 12 and 14 are spaced by the axial dimension of the tubular insulating cylinder 32, or molded coil spool, when the cylinder and plate members are integral, with the facing surfaces of the plate members 12 and 14 positioned against the outwardly facing surfaces of the insulating plate members 28 and 30, respectively. The magnetic yoke members 16 and 18 are dimensioned between their leg portions to snugly extend over the spaced magnetic plate members 12 and 14. The magnetic yoke members 16 and 18 are disposed at opposite sides of the assembled winding assembly 20 and magnetic plate members to complete a magnetic circuit around the outside of the winding assembly 20. A slot 27 is provided in each magnetic plate member 12 and 14 which extends from one side of the plate member into the opening, to prevent the circulation of eddy current around the openings in the magnetic plate members 12 and 14.

The magnetic circuit members comprising the magnetic plates 12 and 14 and the yokes 16 and 18, along with the winding assembly 20, generally comprise the stator of the mechanism 10. As illustrated in FIG. 1, the stator has a longitudinal axis 99 which coincides with the axis of the opening in the electrical coil or winding 34.

The movable parts of the mechanism 10 are attached to the support assembly 22. The movable parts, which include the iron vane may be rotatably mounted via steel pivots disposed on the ends of the vane shaft, which turn in jewel bearings. With this mounting arrangement spiral springs are provided to provide the restoring torque. The movable parts are preferably suspended for rotational movement between a pair of taut bands, such as described in detail in U.S. Pat. No. 3,111,623, which is assigned to the same assignee as the present application. The taut band suspension eliminates the rolling friction inherent in the pivot and jewel arrangement, and is less susceptible to damage due to shock and vibration. The taut bands also eliminate the torque spring, as the twisting of the taut bands as the movable element rotates provides the restoring force. The movable iron vane reaches a state of equilibrium when the deflecting torque equals the torsion resistance of the taut bands. For purposes of example, the invention is illustrated and described with a taut band suspension, but it is to be understood that the invention applies to any type of mounting and restoring force arrangement.

More specifically, the support assembly 22 includes first and second spaced support members 54 and 56, with a taut band extending from each support member to a moving iron vane assembly 58 located between the spaced support members 54 and 56. A tension spring associated with each support member provides the desired tension for each taut band, such as spring 59 associated with the support member 56. The moving iron vane assembly 58 includes a cylindrical member 60, opposite ends of which are connected to the two taut bands, with the member 60 being maintained in a vertical position by the tension on the taut bands. Cylindrical member 60 may be tubular or solid. The longitudinal axis of the cylindrical tubular member 60 coincides with the longitudinal axis 99 of the electrical coil 36.

The moving iron vane assembly 58 further includes a pointer 62 and a magnetic element 64 which functions as the moving iron vane, with the pointer 62 and the element 64 both being attached to the cylindrical member 60. The pointer 62 and the magnetic element 64 are pivotable about the longitudinal axis 99 of the cylindrical member 60, subject to the restraint or restoring force provided by the torsional stiffness of the taut bands.

The pointer 62 provides an indication of the amount of deflection or rotation of the moving iron vane member or element 64. The amount of deflection is measured by the position of the pointer on an instrument dial 66. The graduation on the dial 66 may correspond to any quantity being indicated by the instrument which is responsive to the current flowing through the coil 34. The pointer 62 moves between first and second angular positions which correspond to zero scale and full scale positions, respectively.

The moving iron vane element 64 is formed of a soft magnetic material, such as the material used for the magnetic elements of the stationary portion of the mechanism. The moving iron vane element 64 extends between the central openings 40 and 42 of the magnetic plate members 12 and 14 when the instrument 9 is assembled. Due to the magnetic properties of the moving iron vane element 64, a magnetic path is provided through the central opening of the winding assembly 20 by the cooperation of the moving iron vane element 64 with the portions of the magnetic plate members 12 and 14 which define their central openings 40 and 42.

In prior art stationary coil-moving iron extra long scale instruments, as hereinbefore explained, both the attraction and repulsion principles are utilized. The attraction and repulsion iron elements are tubular in cross-section, with a repulsion iron element disposed centrally within a tubular insulating member, which is surrounded by the electrical coil. An attraction iron element is located opposite each end of the repulsion iron element, with the facing ends of the attraction and repulsion iron elements being spaced. The facing ends are also curved. The moving iron vane is somewhat trapezoidally shaped, starting with a predetermined dimension at the rotational axis and curving outwardly towards both ends of the tubular insulating member, resulting in a larger dimension at its outwardly extending end, which end is bent to provide a substantially L-shaped cross-sectional configuration. These curves on the stationary and rotational magnetic elements are developed to increase the permeance of the magnetic circuit through the vane, as the vane rotates due to increasing current through the coil.

While the prior art instruments with the tubular stationary magnetic elements provide good results, the tolerances required in the manufacture of the tubular iron elements, as well as in their assembly to obtain the desired spacing relative to one another and to the moving iron vane, adds substantially to the cost of the instruments.

The present invention substantially reduces the manufacturing and assembly cost of the stationary coil-moving iron instrument, as the stationary magnetic elements, i.e., the magnetic plates, may be stamped to close tolerances from a sheet of suitable magnetic material, and the assembly of the spaced plates and winding is a simple process which is accurately reproducible without tedious adjustment.

As hereinbefore stated, the magnetic plate members 12 and 14 each define central openings, referenced 40 and 42, respectively, which openings extend between the flat, major, parallel opposed surfaces of their associated plate members. At least one of the openings 40 or 42 has a generally spirally-shaped configuration. In a preferred embodiment of the invention the openings 40 and 42 are of like configuration and dimensions, each having a generally spirally-shaped configuration. The openings 40 and 42 are similarly oriented and aligned with the longitudinal axis 99 of the coil 34 to provide a continuously increasing permeance through the magnetic circuit or flux path which includes the stationary and moving iron elements of the mechanism 10 as the moving iron element rotates due to the torque exerted on the element in response to increasing current flow through the coil 34. The increasing permeance is provided by a reduction of the separation between the moving iron vane element 64 and the edges of the openings 40 and 42 as the angle of rotation of the moving iron vane element 64 increases from that angle which indicates the zero scale position, to that angle which indicates full scale deflection. The configuration of the generally spirally-shaped opening in each of the magnetic plate members is selected to obtain a satisfactory, substantially linear scale distribution.

The mechanism 10 described to this point provides excellent results on instruments having conventional length scales. However, it was found that the wide range of pointer movement required for extended scale instruments, such as the 250° circular scale instrument, could not be achieved using only spirally-shaped openings in the magnetic plate members.

In the process of trying to extend the range of pointer movement to make the mechanism suitable for extended scale instruments, it was found that for a given angular movement $\theta$ of the moving iron vane element 64, such as 180° or 250°, for a given magnetomotive force F, such as 100 ampere turns, that a predetermined change in permeance must be achieved between the zero and full scale positions of the moving iron element. The absolute values of the permeance of the magnetic circuit which includes the stationary and movable magnetic elements of the mechanism 10 at the scale extremes were not important. It is the change in permeance or reluctance of the magnetic circuit, at each of the two scale positions, that is critical and must be achieved. It was further found that for any shaped opening in the magnetic plate members 12 and 14, and any configuration for the moving iron vane 64, that the permeance of the magnetic circuit could be measured at the zero and full scale positions, and that if the difference in permeance at these two points did not equal or exceed a predetermined value, the instrument simply would not achieve the desired range of pointer movement. It was found that the total change in permeance required for a given angular movement for a given magnetomotive force could be determined by the following equation:

$$P_2 - P_0 = \frac{K_1 \theta_1^2}{F_1 a} + \frac{2K_1}{K_2^2} \left[ \ln\left(\frac{F_2}{F_1}\right) + \frac{a}{F_2} - \frac{a}{F_1} \right]$$

where:

$P_2 - P_0$ = change in permeance required in Webers/ampere turn $K_1$ = torsional stiffness of the suspension in Newton-meters/radian $F_2$ = ampere turns at required full scale deflection angle.

$F_1$ = ampere turns at start of linear deflection angle $a$ = ampere turns where the extension of the linear scale would cross the Y-axis ($\theta = 0°$)

$\theta_2$ = desired full scale angular deflection in radians $\theta_1$ = angular deflection at start of linear scale portion in radians $K_2$ = desired slope of linear scale.

Figure 10:
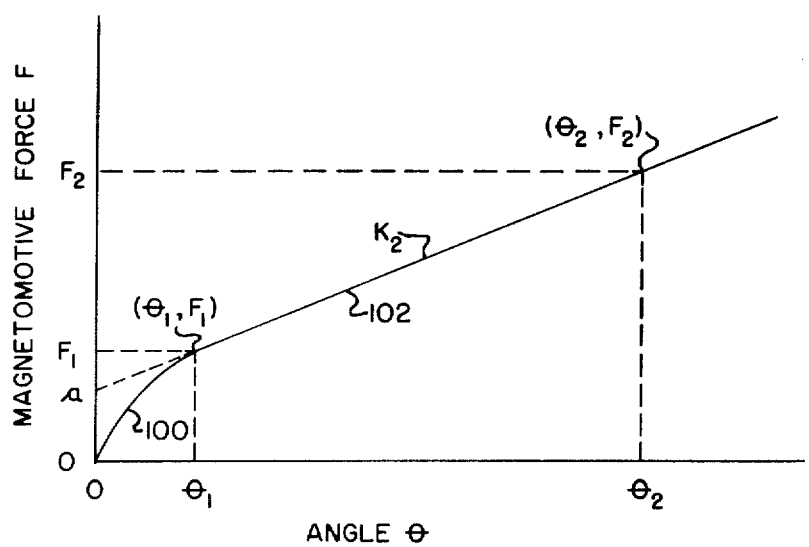
FIG. 10 is a graph illustrating the desired characteristics of a substantially linear stationary coil-moving iron mechanism.

The equation may be better understood by referring to FIG. 10, which illustrates a graph showing the desired characteristics of a stationary coil-moving iron instrument. The angular movement $\theta$ of the moving iron vane 64 is plotted on the X-axis, and the magnetomotive force F provided by the winding 34 is plotted on the Y-axis. A stationary coil-iron vane instrument is inherently non-linear at the start of its deflection, i.e., at the angular location which indicates the zero end of the scale. Thus, the ideal deflection versus magnetomotive force curve has a short non-linear portion 100 which rises exponentially from zero magnitude and quickly forms a smooth transition into a linear portion 102 which has a predetermined slope $K_2$. A linear deflection which passes through the origin would require an infinite change in permeance, which of course is not possible.

The first term of the equation listed above indicates the change in permeance required to move the iron vane element from zero deflection ($\theta = 0°$) to a predetermined angle $\theta_1$ at which point the deflection becomes linear with increasing magnetomotive force. The letter $a$, indicates the magnetomotive force where an extension of the linear portion 102 of the deflection curve would cross the Y-axis. The second term of the equation indicates the change in permeance required to deflect the pointer over the linear portion 102 of the deflection curve. $\theta_1$ and $F_1$ are the coordinates of the start of the linear portion 102 of the deflection curve, and $\theta_2$ and $F_2$ are the coordinates of the curve at full scale deflection.

Typical 1 for the various variables and constants in the equation for a 250° deflection at 100 ampere turns are as follows:

$K_1 = 1.748 \times 10^{-6}$ Newton-meters/radian
$a = 8$ ampere turns
$\theta_1 = 12° = 0.2095$ radian
$F_2 = 100$ ampere turns
$\theta_2 = 250° = 4.37$ radians $$K_2 = \frac{100 - 8}{4.37} = 21.05 \text{ ampere turns/radian}$$

$F_1 = 8 + 21.05 (0.2095) = 12.42$ ampere turns

Using these values, the total change in permeance required is $135.7 \times 10^{-10}$ Webers/ampere turn. A structure which provides this total change has the potential for a successful linear 250° instrument which has a full scale deflection at a magnetomotive force of 100 ampere turns. Once a structure is provided which will produce this change in permeance between the end points of the scale, then the trajectory or locus of the permeance change between the already determined end points is established to provide the linear characteristic desired.

FIG. 1 illustrates a mechanism 10 constructed to achieve a change in permeance between the zero and full scale deflections of a moving iron vane element 64, which enables the mechanism to be successfully used in extended scale instruments, such as the 250° circular scale instrument, with the full scale deflection occurring at a reasonable magnitude of magnetomotive force, such as 100 ampere turns. Simply increasing the ampere turns to obtain the desired range of pointer movement is not practical, as it increases the burden of the instrument on the circuit whose parameter is being measured, and it also creates problems due to heating and saturation of the magnetic elements of the mechanism.

The desired change in permeance is achieved by depressing the magnetic potential at the zero end of the scale, and by increasing the magnetic potential at the maximum deflection end of the scale, and this result is achieved without introducing difficult to manufacture parts, or introducing critical operations into the assembly and calibration of the components.

More specifically, the magnetic potential at the zero end of the scale is depressed by reducing the permeance through the magnetic circuit which includes the moving iron vane element 64, the magnetic plate members 12 and 14, and magnetic yokes 16 and 18, by providing a magnetic shunt or shield 67, and by locating the shield 67 such that it forms a second flux path which diverts magnetic flux from the moving iron vane element 64 when the element 64 is at the zero or low end of the scale. The magnetic potential at the maximum deflection or high end of the scale is increased, increasing the permeance of the magnetic circuit through the moving iron vane 64, by terminating the spirally-shaped openings 40 and 42 with inward projections 50 and 52, respectively. Each opening, such as opening 40 in the magnetic plate 12, starts at the slot 27 at the low end of the scale and spirals smoothly inwardly, to reduce the spacing between the moving iron vane element 64 and the adjacent edges of the magnetic plate elements 12 and 14 which define the openings 40 and 42, respectively. At a point 51, the spiral is terminated and the relatively wide projection 50 is formed, having a straight, flat portion 53 which increases the magnetic potential at this portion of the scale. The straight flat portion 53 terminates at corner 55 and then extends towards the outer edge of the plate 12, forming a side of the projection 50 which is substantially perpendicular to the portion 53. The projections 50 and 52, while increasing the permeance at the high end of the scale are relatively close to the zero end of the scale. The shield 67 is constructed to have substantially an L-shape, which construction prevents the projections 50 and 52 from influencing the permeance of the magnetic circuit at the low end of the scale. The shield 67 includes first and second portions 68 and 80, with the first portion 68 being disposed such that it lies between the moving iron vane element 64 and the portion of the openings in the magnetic plates 12 and 14 at the start of the spiral, i.e., the portion of the spiral with the largest radius, and the second portion 80 extends inwardly from portion 68 to shield the moving iron vane element 64 from the projections 50 and 52 when the element 64 is located at the zero or low end of the scale.

The shield 67 includes a support member 70 for mounting the shield 67 on the support assembly 22. Support member 70 may be slotted to permit adjustment of the shield 67 relative to the magnetic plate members 12 and 14 about an axis which coincides with the longitudinal axis 99 of the cylindrical member 60. Once the shield 67 has been adjusted to provide the desired calibration or full scale deflection, its position is secured, such as by a screw 71 which extends through the slotted support member 70 into the mounting plate 21.

FIG. 2 is a plan view of the mechanism 10 shown in FIG. 1, and FIG. 3 is a cross-sectional view of the mechanism 10 shown in FIG. 2, taken in the direction of arrows III—III. Referring to both FIGS. 2 and 3, a current flowing through the coil or winding 34 produces opposite magnetic poles on the surfaces of the magnetic plates 12 and 14, particularly near the surfaces which define their openings 40 and 42, respectively. A magnetic field is produced between these two surfaces when they are of different polarities which is responsive to the magnitude of the current flowing in the winding 34. Since the magnetic flux encircles the winding 34, the magnetic flux finds a relatively low reluctance magnetic path through the outer portions of the magnetic plates 12 and 14 and the magnetic yokes 16 and 18. The magnetic flux lines seek to close upon themselves by traversing a path between the magnetic plates 12 and 14 through the opening in the winding 34. A portion of the flux is conducted in a first flux path or magnetic circuit which includes the moving iron vane element 64, and a portion of the flux is conducted in a second flux path or magnetic circuit which includes the shield 67, both of which are located within the opening of the winding 34. Both the element 64 and the shield 67 extend into planes which generally contain the flat major opposed surfaces of the magnetic plates 12 and 14. The flux path through the moving iron vane element 64 traverses air gaps located between the element 64 and the magnetic plates 12 and 14, such as the air gap 74. The flux path through the magnetic shield 67 traverses air gaps between the magnetic shield 67 and the magnetic plates 12 and 14, such as the air gaps 76.

Due to the different magnetic polarities established on the portions of the magnetic plates 12 and 14 which define the generally spirally-shaped openings 40 and 42, respectively, and upon the moving iron vane element 64, a torque in the direction indicated by arrow 78 is exerted on the moving iron vane element 64. Thus, the moving iron vane element 64 tends to rotate in a direction which moves the element 64 closer to the boundaries of the spirally-shaped openings 40 and 42. Consequently, the length of the air gaps between the element 64 and the magnetic plates 12 and 14 decrease as the deflection of the element 64 increases, which results in a decrease in the magnetic path reluctance, which may also be called an increase in the permeance of the magnetic path or circuit. The generally spirally-shaped openings are shaped and dimensioned in a manner which gives the desired linear deflection-current characteristic. Since the torsional restraining effect of the taut bands requires a greater torsional force to deflect or rotate element 64 near the full scale deflection region of the mechanism 64, it is necessary that the air gap distance be reduced as the deflection increases in order to provide the torque necessary to continue to deflect the moving iron vane element 64. Thus, the radius of the spirally-shaped opening 44 is smaller at region 44 adjacent the high end of the scale, than it is at the region 48, adjacent the low or zero end of the scale.

The projection 50 on the magnetic plate member 12 provides increased attraction between the plate 12 and the magnetic element 64 near the full scale deflection region of the instrument. As hereinbefore stated, the shield 67 is substantially L-shaped, with the radial portion 80 shielding the moving iron vane element 64 from the projections 50 and 52 when the moving iron vane element 64 is near the zero scale deflection region. The shield 67 also provides means for adjusting the full scale deflection of the mechanism by effectively shunting part of the magnetic flux between the magnetic plates 12 and 14. In addition, the shield 67 reduces the magnetic field seen by the moving iron vane element 64 when it is near the zero scale deflection region. In other words, the magnetic potential adjacent to the element 64 is reduced at this end of the scale. By reducing the amount of magnetic attraction between the plates 12 and 14 and the moving iron vane element 64 at the zero scale deflection region with the shield 67, and by increasing the attraction between the moving iron vane element 64 and the magnetic plates 12 and 14 near the full scale deflection region of the mechanism, with the projections 50 and 52, an instrument may be constructed having the desired deflection-current characteristic.

FIGS. 4 and 5 are front and side elevational views of the moving iron vane assembly 58 illustrating the details of its construction. The moving iron vane assembly 58 includes the moving iron vane element 64. The element 64, which is formed of a substantially rectangular strip of magnetic material having first and second ends, has its first and second ends bent away from the major plane of the strip in the same direction, resulting in a structure having a substantially vertically oriented central portion 84, and upper and lower portions 65 and 67, respectively, with the latter portions extending toward the magnetic plate members 12 and 14.

Figure 9:
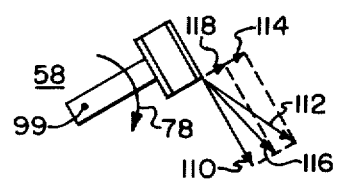
FIG. 9 is a plan view of the moving iron vane shown in FIG. 2, along with vectors which illustrate certain forces which act upon the vane.

The spacing between the moving iron vane element 64 and the magnetic plates 12 and 14 has an important affect on the reluctance of the magnetic path between the magnetic plates 12 and 14 and the element 64. It is desirable to reduce the spacing to reduce the reluctance and increase the torque applied to the movable assembly 58. However, the torque applied to the movable assembly 58 in addition to the desirable circumferential component has a radial component which must be minimized to prevent it from adversely affecting the support means which supports the movable assembly. It has been found that the structure for the moving iron vane element 64 shown in FIGS. 4 and 5, whereby the spacing between the portion 84 of the element 64 and the magnetic plates 12 and 14 is relatively large, with portions 65 and 67 bent toward the magnetic plates 12 and 14, respectively, reduces the radial component of the torque force while providing the desired circumferential torque for rotating the movable assembly. This is illustrated in FIG. 9, which is a plan view of the movable assembly 58. If the desired turning torque is illustrated by vector 110, a moving iron vane element without the ends bent as illustrated would have to be spaced relatively close to the magnetic plates 12 and 14, providing a torque vector 112 which has a relatively large radial component illustrated by the vector 114. With the disclosed structure of the moving iron vane element 64, whereby the outwardly extending ends thereof are bent inwardly toward the magnetic plates 12 and 14, the portion 84 of the element 64 may be spaced further from the magnetic plates 12 and 14, providing a torque vector 116 which provides the desired turning torque 110 with a relatively small radial component, which is illustrated by vector 118.

Returning to FIGS. 4 and 5, the movable assembly 58 is completed by a bracket 86 which is attached to portion 84 of the moving iron vane element 64, by a suitable process such as welding or soldering. It is secured to the side of portion 84 which is opposite to the side on which the bent portions 65 and 67 extend. Arms 88 and 90 are fixed to the bracket 86, and they extend perpendicularly outward therefrom for connection to the cylindrical member 60, which, as hereinbefore explained, is disposed between the taut bands. The bracket 86 contributes to the functional operation of the mechanism 10, providing twice the cross-sectional area for flux flow in the body portion of the movable element without adding like mass to the outwardly extending ends 65 and 67. This arrangement provides a mechanically well balanced assembly on the taut bands while preventing magnetic saturation of the iron vane element 64.

An electrical measuring instrument was constructed according to the teachings of the invention, to provide a 250° deflection at 100 ampere turns. The construction of this instrument will now be described as an example of a measuring instrument which may be constructed according to the teachings of the invention. It is to be understood, however, that the dimensions and materials listed may be changed without departing from the spirit and scope of the invention. More specifically, the magnetic plates 12 and 14 were constructed of 0.026 inch thick Hipernik. The outer configuration of the plates was a square, dimensioned 2.5 inches on a side. The thickness of the magnetic plates is not critical, with the selection being more for mechanical rigidity than due to functional criticality. The tubular insulating cylinder 32 was formed of a laminated plastic material, with the longitudinal length of the cylinder, being 0.500 inch. The I.D. of the tubular cylinder 32 was 1.625 inches, and its O.D. was 1.750 inches. The magnetic yokes 16 and 18 were each formed of .026 inch thick Hipernik formed into a U-shaped channel having a length dimension of 2.5 inches. The spacing between the leg portions of the channel was 0.554 inch, and the depth of the legs measured to the channel bight was 0.437 inch.

Referring to FIGS. 4 and 5, the moving iron vane element 64 was formed of 0.014 inch Hipernik. The overall length of the element 64, before bending the ends thereof, was 1.143 inches and its width was 0.250 inch. The ends 65 and 67 were bent inwardly to each provide an angle of 35°, indicated with reference numeral 120, with the bending of the ends resulting in an overall dimension of 1.050 inches, which dimension is indicated by reference 122. The central portion 84 had a vertical dimension of 0.621 inch, indicated by reference 124, and each of the portions 65 and 67 have a length dimension of 0.261 inch, indicated by reference 126. The bracket 86 was formed of 0.014 inch Hipernick with dimensions to match those of portion 84. The arms 88 and 90, which are 0.0625 inch wide, extend outwardly from the bracket 86 for a dimension of 0.480 inch.

Figure 6:
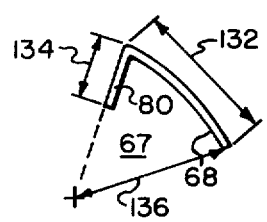
FIGS. 6 and 7 are plan and elevational views, respectively, of a substantially L-shaped shield member utilized in the mechanism of FIGS. 1, 2 and 3.
Figure 7:
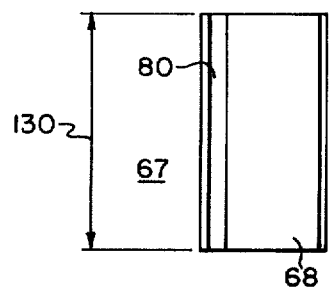

FIGS. 6 and 7 illustrate plan and elevational views of the shield member 67, and it was constructed for the instrument. The shield 67 was constructed of 0.014 inch Hipernik, with its overall length, indicated by reference 130, being 0.870 inch. The outer surface of portion 68 is curved on a 0.705 inch radius, indicated by reference 136, and the inwardly extending portion 80 of the shield had a dimension of 0.306 inch, indicated 64 reference 134. A chord across the curved outer surface of portion 68, indicated by reference 132, had a dimension of 0.560 inch. Portion 80 was bent inwardly along the radius of the outer curved surface of portion 68.

Figure 8:
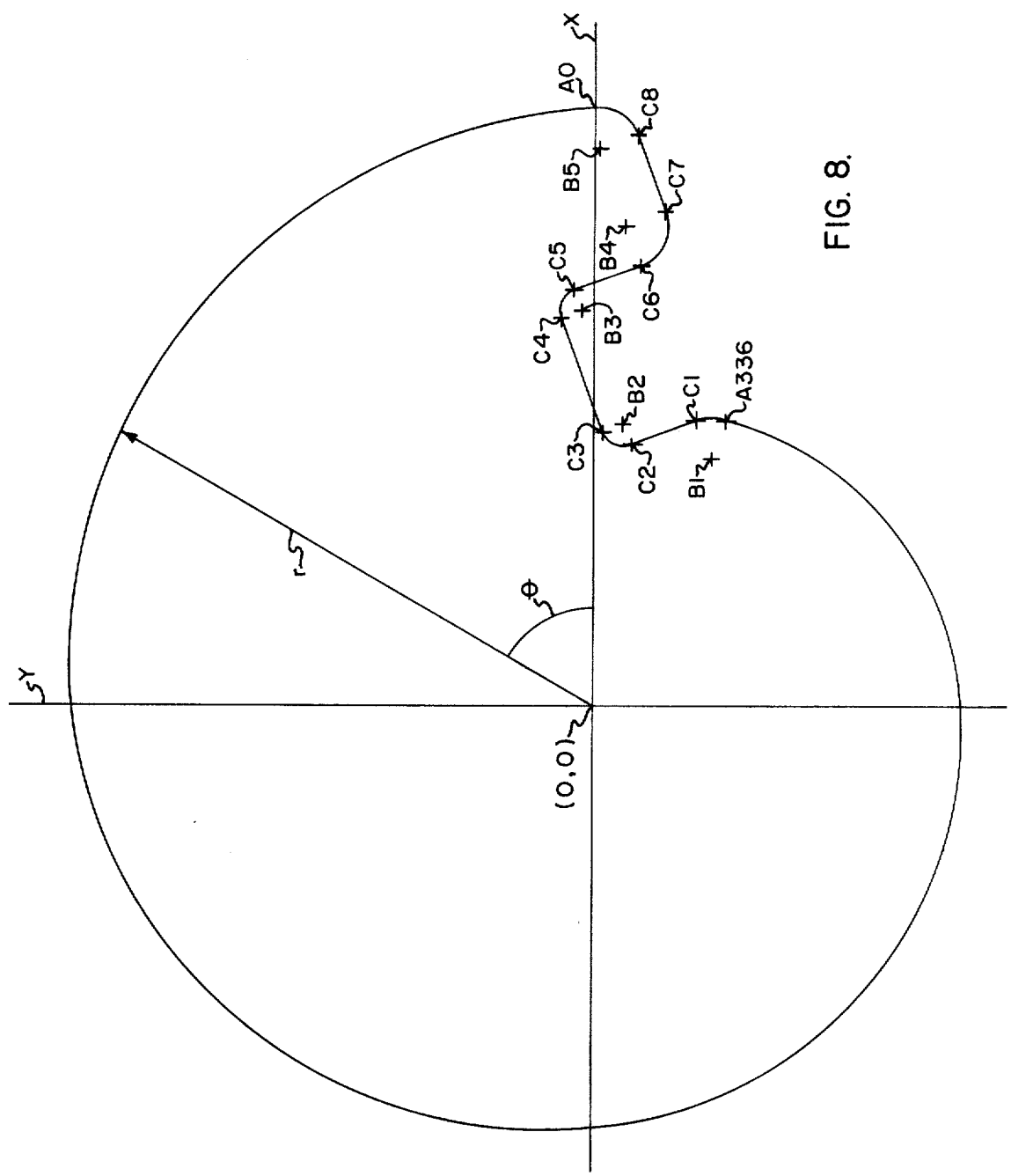
FIG. 8 is an enlarged plan view of the generally spirally-shaped opening in one of the magnetic plates or stator members shown in FIGS. 1, 2 and 3.

FIG. 8 is an enlarged view of the opening in one of the magnetic plate members, such as opening 40 in magnetic plate member 12. As indicated, the origin starts with the coordinates of 0 inch for the abscissa and 0 inch for the ordinate. The generally spirally-shaped portion of the opening, which starts at an angle $\theta$ of 0°, indicated by point AO and extends counterclockwise for 336° to the point A336, may be developed from the values of $\theta$ and $r$ listed in Table I. Table I lists the dimension $r$ from the origin to the curve for an angle $\theta$ which is incremented by 4°, starting at $\theta = 0$ and ending at $\theta = 336°$.

TABLE I

| LOCATION (FIG. 8) | | | | | |
|---|---|---|---|---|---|
| $\theta$ | r | $\theta$ | r | $\theta$ | r |
| 0 | .9078" | 116 | .7465" | 228 | .5977" |
| 4 | .9027 | 120 | .7394 | 232 | .5942 |
| 8 | .8976 | 124 | .7322 | 236 | .5927 |
| 12 | .8924 | 128 | .7252 | 240 | .5871 |
| 16 | .8873 | 132 | .7179 | 244 | .5836 |
| 20 | .8822 | 136 | .7108 | 248 | .5801 |
| 24 | .8771 | 140 | .7037 | 252 | .5765 |
| 28 | .8719 | 144 | .6966 | 256 | .5730 |
| 32 | .8668 | 148 | .6897 | 260 | .5694 |
| 36 | .8617 | 152 | .6829 | 264 | .5658 |
| 40 | .8566 | 156 | .6761 | 268 | .5621 |
| 44 | .8515 | 160 | .6696 | 272 | .5584 |

TABLE I-Continued

| LOCATION (FIG. 8) | | | | | |
|---|---|---|---|---|---|
| θ | r | θ | r | θ | r |
| 48 | .8463 | 164 | .6632 | 276 | .5547 |
| 52 | .8412 | 168 | .6571 | 280 | .5509 |
| 56 | .8365 | 172 | .6518 | 284 | .5470 |
| 60 | .8327 | 176 | .6473 | 288 | .5430 |
| 64 | .8284 | 180 | .6429 | 292 | .5389 |
| 68 | .8236 | 184 | .6387 | 296 | .5346 |
| 72 | .8184 | 188 | .6347 | 300 | .5302 |
| 76 | .8129 | 192 | .6307 | 304 | .5255 |
| 80 | .8073 | 196 | .6268 | 308 | .5207 |
| 84 | .8009 | 200 | .6231 | 312 | .5156 |
| 88 | .7946 | 204 | .6193 | 316 | .5101 |
| 92 | .7880 | 208 | .6157 | 320 | .5044 |
| 96 | .7814 | 212 | .6120 | 324 | .4982 |
| 100 | .7746 | 216 | .6084 | 328 | .4916 |
| 104 | .7676 | 220 | .6048 | 332 | .4845 |
| 108 | .7607 | 224 | .6013 | 336 | .4775 |
| 112 | .7536 | | | | |

The configuration of the opening from point A336 to point A0 may be developed from Table II, which lists the coordinates of the various points indicated in FIG. 8.

TABLE II

| LOCATION (FIG. 8) | COORDINATES | |
|---|---|---|
| | X | Y |
| A336 | .4362" | −.1942" |
| B1 | .3759 | −.1777 |
| B2 | .4261 | −.0427 |
| B3 | .6021 | .0219 |
| B4 | .7278 | −.0483 |
| B5 | .8455 | −.0050 |
| C1 | .4346 | −.1561 |
| C2 | .3968 | −.0535 |
| C3 | .4153 | −.0134 |
| C4 | .5913 | .0513 |
| C5 | .6314 | .0327 |
| C6 | .6692 | −.0698 |
| C7 | .7494 | −.1069 |
| C8 | .8670 | −.0636 |
| A0 | .9078 | .0000 |

B1 is the center of a circle having an arc which extends from point A336 to point C1. The opening then follows a straight line from point C1 to point C2. B2 is the center of a circle having an arc which extends from point C2 to point C3. The opening then follows a straight line from point C3 to point C4. B3 is the center of a circle having an arc which extends from point C4 to point C5. The opening then follows a straight line from point C5 to point C6. B4 is the center of a circle having an arc which extends from point C6 to point C7. The opening then follows a straight line from point C7 to point C8. B5 is the center of a circle having an arc which extends from point C8 to point A0, completing the opening.

A stationary coil-moving iron mechanism having spaced magnetic plate members with openings having the configuration and dimensions illustrated in FIG. 8 and Tables I and II, provides a very linear scale distribution from about 12° deflection to 250° deflection, using the materials and dimensions thereof listed for the various magnetic elements of the stator and movable portions of the mechanism 10.

In summary, there has been disclosed a new and improved instrument having a stationary coil-moving iron mechanism which may be accurately reproduced on a production basis, with the production instruments closely matching one another in reproducing the desired rotational angle versus current characteristic. The construction of the component parts lend themselves to easily reproducible manufacturing methods, such as stamping, and the parts may be quickly and easily assembled to the desired tolerance without time consuming adjustment.

I claim:

1. An electrical instrument, comprising:
   a magnetic circuit and winding assembly having an opening therein,
   said magnetic circuit and winding assembly including first and second spaced magnetic plate members, each of said first and second magnetic plate members defining an opening, with at least one of the openings having a generally spirally-shaped configuration, and an electrical coil disposed relative to said spaced first and second plate members such that they acquire different magnetic polarities in response to current flow through said electrical coil,
   a movable assembly mounted for restrained rotation within the opening of said magnetic circuit and winding assembly,
   said movable assembly including a magnetic element which provides a first magnetic circuit between said first and second magnetic plate members,
   and indicating means coupled to said movable assembly for indicating the angular position of said movable assembly,
   said magnetic element of said movable assembly coacting with the magnetic flux provided by current flow in the electrical coil to provide magnetic polarities on portions of the magnetic element adjacent to said first and second magnetic plate members which are different than those of the adjacent magnetic plate members to provide attractive forces which exert a torque on the movable assembly, said torque rotating the restrained movable assembly, with the permeance of the first magnetic circuit changing as the movable member rotates in either direction, due to the generally spirally-shaped configuration of at least one of the openings defined by the first and second magnetic plate members.

2. The electrical instrument of claim 1 wherein the magnetic element of the movable member is located relative to the openings in the first and second plate members such that rotation of the movable member due to increasing current through the electrical coil reduces the spacing, in a plane perpendicular to the longitudinal axis of the electrical coil, between the movable member and the edges of at least one of the first and second plate members which define their openings.

3. The electrical instrument of claim 1 wherein the magnetic element rotates between first and second angular positions when the current through the electrical coil increases from zero to a predetermined value, and including means disposed adjacent the first angular position which reduces the magnetic potential and amount of magnetic attraction between the magnetic element and the first and second magnetic plate members adjacent the first angular position.

4. The electrical instrument of claim 1 wherein the magnetic element rotates between first and second angular positions when the current through the electrical coil increases from zero to a predetermined value, and including means positioned adjacent the second angular position which increases the magnetic potential and amount of magnetic attraction between the magnetic element and the first and second magnetic plate members adjacent the second angular position.

5. The electrical instrument of claim 1 wherein the magnetic element rotates between first and second angular positions when the current through the electrical coil increases from zero to a predetermined value, and including means disposed adjacent the first angular position which reduces the magnetic potential and attraction between the magnetic element and the first and second magnetic plate members adjacent the first angular position, and means disposed adjacent the second angular position which increases the magnetic potential and attraction between the magnetic element and first and second magnetic plate members adjacent the second angular position.

6. An electrical instrument, comprising:
a magnetic circuit and winding assembly having an opening therein,
said magnetic circuit and winding assembly including first and second spaced magnetic plate members, each of said first and second magnetic plate members defining an opening, with at least one of the openings having a generally spirally-shaped configuration, and an electrical coil disposed relative to said spaced first and second plate members such that they acquire different magnetic polarities in response to current flow through said electrical coil,
a movable assembly mounted for restrained rotation within the opening of said magnetic circuit and winding assembly,
said movable assembly including a magnetic element which provides a first magnetic circuit between said first and second magnetic plate members,
and indicating means coupled to said movable assembly for indicating the angular position of said movable assembly,
said magnetic element of said movable assembly coacting with the magnetic flux provided by current flow in the electrical coil to provide a torque on the movable assembly, said torque rotating the restrained movable assembly, with the permeance of the first magnetic circuit changing as the movable member rotates in either direction, due to the generally spirally-shaped configuration of at least one of the openings defined by the first and second magnetic plate members,
said magnetic element rotating between first and second angular positions responsive to an increase of current through the electrical coil from zero to a predetermined magnitude,
and a magnetic shield member positioned to reduce the magnetic potential at the first angular position of the magnetic element and increase the difference in permeance of the first magnetic circuit between the first and second angular positions of the magnetic element.

7. The electrical instrument of claim 1 wherein the magnetic element rotates between first and second angular positions responsive to an increase of current through the electrical coil from zero to a predetermined magnitude, and wherein at least one of the first and second magnetic plate members defines a projection which extends into its associated opening to increase the magnetic potential and attraction between the magnetic element and the first and second magnetic plate members adjacent the second angular position and increase the difference in permeance of the first magnetic circuit between the first and second angular positions of the magnetic element.

8. An electrical instrument, comprising:
a magnetic circuit and winding assembly having an opening therein,
said magnetic circuit and winding assembly including first and second spaced magnetic plate members, each of said first and second magnetic plate members defining an opening, with at least one of the openings having a generally spirally-shaped configuration, and an electrical coil disposed relative to said spaced first and second plate members such that they acquire different magnetic polarities in response to current flow through said electrical coil,
a movable assembly mounted for restrained rotation within the opening of said magnetic circuit and winding assembly,
said movable assembly including a magnetic element which provides a first magnetic circuit between said first and second magnetic plate members,
and indicating means coupled to said movable assembly for indicating the angular position of said movable assembly,
said magnetic element of said movable assembly coacting with the magnetic flux provided by current flow in the electrical coil to provide a torque on the movable assembly, said torque rotating the restrained movable assembly, with the permeance of the first magnetic circuit changing as the movable member rotates in either direction, due to the generally spirally-shaped configuration of at least one of the openings defined by the first and second magnetic plate members,
said magnetic element rotating between first and second angular positions responsive to an increase of current through the electrical coil from zero to a predetermined magnitude,
and a magnetic shield member positioned to establish a second magnetic circuit between the spaced first and second magnetic plate members and reduce the magnetic potential adjacent the first angular position of the magnetic element,
at least one of said first and second magnetic plate members defining a projection which extends into its associated opening to increase the magnetic potential adjacent the second angular position of the magnetic element, said magnetic shield member and said at least one projection cooperating to increase the difference in permeance of the first magnetic circuit between the first and second angular positions of the magnetic element.

9. The electrical instrument of claim 8 wherein the magnetic shield member includes a portion which shields the magnetic element from the at least one projection defined by at least one of the first and second magnetic plate members, when the magnetic element is in the first angular position.

10. The electrical instrument of claim 1 including first and second means disposed adjacent positions of minimum and maximum deflection, respectively, of the magnetic element, which respectively reduces and increases the attraction between the magnetic element and the first and second magnetic plate members to increase the total change in permeance of the first magnetic circuit as the magnetic element moves between the positions of minimum and maximum deflection.

11. The electrical instrument of claim 1 wherein the at least one spirally-shaped opening in one of the first and second magnetic plate members is dimensioned to provide a substantially linear deflection of the magnetic element in response to change in the magnitude of the current flow through the electrical coil.

12. The electrical instrument of claim 1 wherein the magnetic element is a substantially rectangularly shaped strip having first and second ends, with the major plane of the strip extending between the first and second magnetic plate members, and with the first and second ends of the strip being bent to extend towards said first and second magnetic plate members, respectively.

13. The electrical instrument of claim 1 wherein the magnetic element rotates between first and second angular positions in response to current flow in the electrical coil increasing from zero to a predetermined magnitude.

14. The electrical instrument of claim 1 wherein the magnetic element moves at least 180° between the first and second angular positions.

15. An electrical instrument comprising:
a coil,
first and second stationary magnetic plate-like members positioned in spaced parallel relation relative to one another, and relative to said coil to acquire different magnetic polarities thereon due to current flowing through the coil, said first and second magnetic members respectively defining first and second spirally-shaped openings therein,
a movable member disposed substantially between the first and second spirally-shaped openings, said movable member being constructed of a magnetic material and providing a first flux path between the portions of the first and second magnetic members which define the spirally-shaped openings,
indicating means coupled to the movable member for indicating the angular position of the movable member,
and means mounting the movable member for restrained rotation about an axis which extends perpendicularly through the planes generally containing the spirally-shaped openings,
said movable member coacting with the magnetic flux provided by current flow through the electrical coil to provide magnetic polarities on portions of the movable member adjacent to said first and second magnetic plate members which are different than those of the adjacent magnetic plate members to provide attractive forces which exert a torque on the movable member, with the reluctance of the first flux path and attractive forces between the movable member and the magnetic plate members changing as the movable member rotates in either direction, due to the spirally-shaped openings changing the spacing between the movable member and the first and second magnetic plate members.

16. An electrical instrument comprising:
a coil,
first and second stationary magnetic plate-like members positioned in spaced parallel relation relative to one another, and relative to said coil to acquire different magnetic polarities thereon due to current flowing through the coil, said first and second magnetic members respectively defining first and second spirally-shaped openings therein,
a movable member disposed substantially between the first and second spirally-shaped openings, said movable member being constructed of a magnetic material and providing a first flux path between the portions of the first and second magnetic members which define the spirally-shaped openings,
indicating means coupled to the movable member for indicating the angular position of the movable member,
means mounting the movable member for restrained rotation about an axis which extends perpendicularly through the planes generally containing the spirally-shaped openings,
said movable member coacting with the magnetic flux provided by current flow through the electrical coil to provide a torque on the movable member, with the reluctance of the first flux path changing as the movable member rotates in either direction, due to the spirally-shaped openings changing the spacing between the movable member and the first and second magnetic plate members,
and a magnetic shunt positioned between the spirally-shaped openings to provide a second flux path between the portions of the first and second magnetic members which define the spirally-shaped openings, with the relative positions of the magnetic shunt and the first and second magnetic members being adjustable to calibrate the full scale deflection of the movable member.

17. The electrical instrument of claim 16 wherein the magnetic shunt is positioned adjacent to the portions of the spirally-shaped openings which have the largest radius, for increasing the reluctance of the first flux path when the movable member is at the zero scale position.

18. The electrical instrument of claim 15 wherein the first and second magnetic members respectively include first and second projections which cooperate in defining the spirally-shaped openings, said projections being positioned adjacent to the portions of the spirally-shaped openings which have the smallest radius, for increasing the permeance of the first flux path and increasing the attraction between the movable member and the magnetic plate members when the movable member is at the full scale position.

19. An electrical instrument comprising:
a coil having first and second ends,
first and second magnetic circuit members respectively positioned adjacent to the first and second coil ends and constructed of a magnetic material, said first and second magnetic circuit members respectively defining first and second spirally-shaped openings therein, said first and second magnetic circuit members developing different magnetic polarities adjacent their spirally-shaped openings responsive to current flow through said coil,
a movable member disposed substantially between said first and second spirally-shaped openings, said movable member being constructed of a magnetic material and providing a first flux path between the first and second magnetic circuit members,
indicating means connected to the movable member for indicating the angular position of the movable member, and means mounting the movable member for restrained rotation about the longitudinal axis of said coil, between the spirally-shaped openings, said movable member coacting with the magnetic flux provided by current flow through said coil to provide attractive forces between the movable member and said first and second magnetic circuit members which rotate said movable member in response to increasing current magnitude in a direction which reduces the reluctance of the first flux path and increases the attractive forces between the movable member and the first and second magnetic circuit members.

20. The electrical instrument of claim 19 wherein the first and second magnetic circuit members are substantially flat plates constructed of a magnetic material and are disposed adjacent to the first and second ends of the coil, respectively.

21. The electrical instrument of claim 19 wherein the movable member includes a strip of magnetic material having first and second ends positioned with the first end substantially intersecting a plane containing the first magnetic circuit member and with the second end substantially intersecting a plane containing the second magnetic circuit member.

22. The electrical instrument of claim 21 wherein the first and second ends of the strip are bent towards the first and second magnetic circuit members, respectively.

23. The electrical instrument of claim 19 wherein the means mounting the movable member for restrained rotation includes taut bands positioned coincident with the longitudinal axis of the coil.

24. An electrical instrument comprising:

a coil having first and second ends, first and second magnetic circuit members respectively positioned adjacent to the first and second coil ends and constructed of a magnetic material, said first and second magnetic circuit members respectively defining first and second spirally-shaped openings therein, a movable member disposed substantially between said first and second spirally-shaped openings, said movable member being constructed of a magnetic material and providing a first flux path between the first and second magnetic circuit members, indicating means connected to the movable member for indicating the angular position of the movable member, means mounting the movable member for restrained rotation about the longitudinal axis of said coil, between the spirally-shaped openings, said movable member coacting with the magnetic flux provided by current flow through said coil, rotating said movable member in response to increasing current magnitude in a direction which reduces the reluctance of the first flux path, and a magnetic shunt positioned between the spirally-shaped openings to provide a second flux path between the first and second magnetic circuit members, with the position of said magnetic shunt being adjustable to aid in the calibration of the electrical instrument.

25. The electrical instrument of claim 24 wherein the magnetic shunt includes a strip of magnetic material having first and second ends positioned with the first end substantially intersecting a plane containing the first magnetic circuit member, and with the second end substantially intersecting the plane containing the second magnetic circuit member.

26. The electrical instrument of claim 24 wherein the magnetic shunt is positioned with the first end substantially adjacent to the portion of the first magnetic circuit member which defines the portion of the first spirally-shaped opening having the largest radius, and with the second end substantially adjacent to the portion of the second magnetic circuit member which defines the portion of the second spirally-shaped opening having the largest radius.

27. The electrical instrument of claim 19 wherein the first and second magnetic circuit members respectively include first and second projections located substantially adjacent to the portions of the spirally-shaped openings which have the smallest radius to decrease the reluctance of the first flux path and increase the attraction between the movable member and the first and second magnetic circuit members when the movable member is at the full scale position.

28. An electrical instrument comprising:

a coil having first and second ends, first and second plates constructed of a magnetic material and respectively positioned adjacent to the first and second ends of said coil, with the first and second plates respectively having first and second spirally-shaped openings therein, each of said openings having a projection therein from the plate adjacent to the portion of the opening having the smallest radius, first and second substantially U-shaped yoke members constructed of a magnetic material positioned around the outside of said coil and adjacent to the first and second plates, a supporting assembly having taut bands positioned coincident with the axis of the coil, a magnetic strip coupled to the taut bands and extending between the spirally-shaped openings, said magnetic strip providing a first magnetic path between the first and second plates, said first magnetic path having a first air gap between the magnetic strip and the first plate and a second air gap between the magnetic strip and the second plate, said magnetic strip coacting with magnetic flux produced by current flow through said coil to provide a torque on said magnetic strip, said magnetic strip being disposed relative to the openings in said first and second plates such that an increasing current through said coil rotates the magnetic strip to decrease the length of the first and second air gaps, a pointer coupled to the taut bands to indicate the angular position of the magnetic strip, and an L-shaped shield constructed of a magnetic material and extending between the spirally-shaped openings to provide a second magnetic path between the first and second plates, said L-shaped shield being positioned adjacent to the portions of the spirally-shaped openings which have the smaller radius, with one side of the L-shaped shield being adjacent to the portions of the plates which define the spirally-shaped openings and with the other side of the L-shaped shield being adjacent to the projections in the spirally-shaped openings, with the distance between the shield and the projections being adjustable to aid in the calibration of the electrical instrument.

* * * * *